Figure 1:
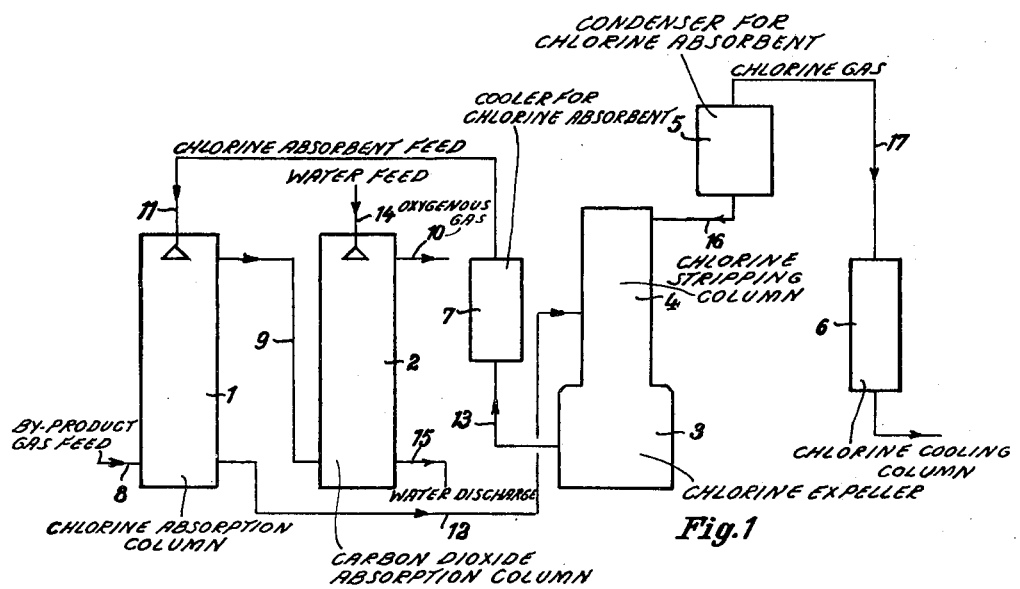

Patented Oct. 20, 1953

2,656,011

UNITED STATES PATENT OFFICE 2,656,011

SEPARATION OF CHLORINE BY ABSORPTION

Walter Frey, Basel, Switzerland, assignor to Saeurefabrik Schweizerhall, Schweizerhalle, Baselland, Switzerland, a corporate body of Switzerland Application April 5, 1949, Serial No. 85,564
In Switzerland April 7, 1948

5 Claims. (Cl. 183—115)

This invention relates to certain improvements in or relating to a process for the treatment of gaseous products of the decomposition of volatile metallic chlorides by means of oxygenous gases particularly for the production of chlorine from the same, and is of particular importance in the case in which the chlorine is intended to be used again for the chlorination of the oxides of metallic ores by the action of carbon as a reducing agent.

The decomposition of metallic chlorides by means of an excess of oxygenous gases results in the formation of gaseous products containing in addition to chlorine also the excess oxygen not used in the process of decomposition. When using air as the oxygenous gas the decomposition gases also contain the nitrogen still present in the oxygenous gas.

In the special case of the decomposition of the volatile metallic chlorides with the help of the combustion of carbonaceous substances within the reaction chamber e. g. by means of carbon monoxide, particularly according to the process described in the United States patent application Serial No. 75,886, filed February 11, 1949, the gaseous products contain in addition considerable quantities of carbon dioxide.

Up to the present time these gases have been treated in such a way that the chlorine has been isolated by compression and liquefaction from the mixture of gaseous products. This method, however, is characterized by the drawback, particularly in presence of larger quantities of foreign gases, that only part of the chlorine can be recovered, the other part remaining in a considerable quantity in the not liquefied residual gas. Thus the economy of this method of separation is greatly impaired.

Now it has been found that it is possible to treat the gaseous products so as to obtain a practically complete separation of pure chlorine by treating them first with a liquid absorbent selective to chlorine and liberating thereupon the chlorine by expelling it from the absorbent. This selective liquid absorbent must of course primarily be inert to chlorine and have a relatively low vapor pressure at the temperatures at which the absorption is realized.

Particularly suitable for this purpose are liquid halogenated substances such as sulfur chloride, chlorohydrocarbons such as pentachloroethane, trichloroethylene, hexychlorobutadiene or the like, perchloric chemical substances such as carbon tetrachloride, and liquid metallic chlorides such as titanium tetrachloride and tin tetrachloride. The absorption may take place at ordinary or room temperature or preferably at low temperatures maintained by appropriate cooling. Carbon dioxide is soluble in the foregoing halogenated absorbents.

The chlorine is expelled from the absorbent enriched by chlorine by heating advantageously at higher temperatures than those applied in the absorption process. This can be effected at reduced, ordinary and increased pressure according to absorbent used. On proceeding in this way the chlorine is obtained in pure form in which state it may again be employed particularly also to chlorinate oxide containing ores and thus provide a cyclic process. The oxygen present in the residual gas freed from chlorine and the carbon dioxide may at least in part be used to decompose further quantities of metallic chlorides. For this purpose the oxygen consumed on decomposing can be supplied again in the residual gas advantageously by fresh oxygen preferably in the form of an oxygenous gas containing a high percentage of oxygen. As a continuous reactivation of the totality of the residual gases would lead to an increasing enrichment of the inert gases, particularly of the carbon dioxide, part of them should be allowed to escape or to find some other usage. The percentage of the residual gases capable of being recycled and thus that of the oxygen capable of being reused depends on the maximum admissible rarefaction by the inert gas of the oxygen serving for the decomposition, on the quantity of carbon oxide equally burnt in the decomposition process, and on the excess of oxygen necessary for the decomposition. If it is desired to effect the decomposition of the metallic chloride with oxygenous gases containing a high percentage of oxygen, particularly when applying the process according to the Swiss Patent 250,370, involving heating the chlorine prior to the chlorination, it is advantageous to proceed to a further purification of the gaseous products by eliminating the carbon dioxide and if necessary also the small quantities of chlorine in them according to a process known per se e. g. by means of pressure absorption in water. In this way an oxygenous gas is obtained which is completely free from carbon dioxide and from chlorine and which may be used without more ado also for other industrial purposes.

An apparatus suitable for the realization of the process according to the invention is shown by way of example in Fig. 1 of the accompanying drawing. In the drawing 1 denotes an absorption column for the chlorine which is preferably provided with a cooling device (not shown), 2 denotes an absorption column for the carbon dioxide, 3, 4 and 5 together denote an expeller for the chlorine consisting of a still 3, a column 4 and a dephlegmator 5 which serves to condense the vapors of the solvent material carried along with the expelled chlorine, 6 denotes a cooler for cooling and, if desired, liquefying the chlorine, and 7 denotes a cooler to cool the absorbent freed from the chlorine. The gaseous products obtained upon decomposing volatile metallic oxides by means of oxygenous gases essentially consisting of chlorine, carbon dioxide and oxygen are fed to the lower part of the chlorine absorption column 1 through the conduit 8 and leave the column 1 freed from chlorine through the conduit 9 which discharges into the lower part of the absorption column 2 for carbon dioxide. The residual gas consisting essentially only of oxygen leaves the absorption column 2 in the upper part through the conduit 10. The chlorine absorbent is fed to the absorption column 1 through conduit 11 and leaves the column saturated with chlorine through the conduit 12, located in the lower part of absorption column 1, by means of which it is introduced in the middle of the stripping column 4 wherein gaseous chlorine is set free. Water is fed to the upper part of the absorption column 2 through the conduit 14, which is discharged again saturated with carbon dioxide through the conduit 15 in the lower part of column 2. The absorbent freed from chlorine leaves the still 3 through the conduit 13 and flows after being cooled in the cooler 7 again back to the absorption column 1. The expelled chlorine leaves the column 4 through the conduit 16 through which also the absorbent condensed in the dephlegmator 5 again flows back to the expeller column 4. The pure chlorine is transferred through conduit 17 again to the cooler 6 and eventually to the liquefier.

The apparatus may be arranged for operation at standard pressure or wholly or partially for operation at increased pressure. The process may be realized, however, also by means of any other apparatus providing means absorbing chlorine and eventually carbon dioxide and expelling chlorine from the solvent.

The following examples may serve as further explanation of the process according to the invention.

*Example 1*

On decomposing 1 volume of titanium chloride vapor by means of 1 volume CO gas and 5 volumes of mixture of 50% oxygen and 50% carbon dioxide, gaseous products are obtained which after separation of the titanium oxide formed is composed of 2 volumes of chlorine, 3½ volumes of carbon dioxide and of 1 volume of oxygen. These gaseous products are fed to an absorption column 1 in which the chlorine is absorbed by means of titanium chloride cooled to 0° C., whereupon a solution with a concentration of 45 grams of chlorine per liter (TiCl₄) is obtained. The residual gases still contain 1-2 per cent by volume of chlorine. Seventy per cent of these residual gases are enriched to an oxygen concentration of 50% by adding 1.8 volumes of 99 per cent oxygen and again used to decompose titanium chloride. The solution of chlorine is fed to an expeller (3, 4) and the chlorine expelled at a pressure of 8 atm. at 230° C. The chlorine gas freed from titanium chloride up to 1 per cent by volume (reduced to standard pressure) by means of the dephlegmator 5 kept at 40° C., is cooled to 10° C. in the cooler 6 and thus directly liquefied. It may be used without further purification directly for the chlorination of rutile. The absorbent leaving the still 3 still contains 1 gram of chlorine per liter (TiCl₄).

*Example 2*

On decomposing 1 volume of zirconium chloride vapour by means of 2 volumes of CO gas and 3 volumes of 95 per cent oxygen there are obtained, after separation of the oxide, gaseous products consisting of 2 volumes of chlorine, 2 volumes of carbon dioxide and of 1 volume of oxygen. These gaseous products are compressed at 10 atm. and then the chlorine is absorbed in the absorption column 1 at 20° C. by means of tin tetrachloride. Thereupon the carbon dioxide is washed out in the absorption column 2. An oxygen gas of 90% O₂ is obtained. The solution of tin tetrachloride has a concentration of 150 grams of chlorine per liter and is fed under expansion to the expeller 3 in which the chloride is expelled at the standard boiling temperature of the tin tetrachloride. The dephlegmator 5 is simultaneously cooled down to 10° C. so that the escaping gaseous chlorine contains only 1-2% of tin tetrachloride vapour. This chlorine is again used after admixture of the 90 per cent oxygen obtained after the absorption to chlorinate the zirconium oxide. The tin tetrachloride leaving the still 3 contains only 2 grams of chlorine per liter.

*Example 3*

1 volume of silicon tetrachloride vapor is decomposed by 2 volumes of carbon monoxide gas and 3 volumes of oxygen. After elimination of the silicon dioxide formed a gas consisting of 40% Cl₂, 40% CO₂ and 20% O₂ is obtained which is fed at a temperature of 20° C. to an absorption column 1 filled with "Raschig" rings and irrigated with sulfur monochloride (S₂Cl₂). A solution of 200 grams Cl₂ in 1000 grams S₂Cl₂ is obtained. The gas leaves the absorption column with a chlorine concentration of 1.5% by volume and is freed in the absorption column 2 from the residual chlorine and the greater part of the carbon dioxide by washing with lime water so that an oxygen content of 95% purity by volume is recovered. The solution of sulfur monochloride is fed to the pressure desorption column 4 which is working at 7 atm. and 250° C. The chlorine leaves the dephlegmator 5 of the column with a content of 2% sulfur dichloride and is liquefied again in the condenser. The liquefied chlorine is directly used to chlorinate the silicon carbide. The sulfur monochloride freed from chlorine after being cooled in the cooler 7 is fed again to the absorption column 1.

As this method permits the utilization of the totality of the chlorine contained in the gaseous products of the decomposition of the metal chloride as well as the oxygen, it is of great economic importance for the preparation of metallic oxides by the chlorine method.

I claim:

1. A process for recovering chlorine from gaseous mixtures obtained from the decomposition of volatile metal chlorides with the aid of a combustion of carbonaceous substances in the presence of an excess of oxygenous gases thereby producing gaseous mixtures containing substantial quantities of carbon dioxide, chlorine, and excess oxygenous gases comprising contacting said gaseous mixtures with a liquid anhydrous sulfur monochloride thereby selectively absorbing the chlorine and heating the absorbent to expell the chlorine.

2. A process for recovering chlorine from gaseous mixtures containing substantial quantities of both chlorine and carbon dioxide comprising contacting said gaseous mixtures with an anhydrous liquid sulfur chloride thereby selectively absorbing the chlorine from the gaseous mixture and thereafter expelling the purified chlorine from the absorbent substantially freed of carbon dioxide.

3. A process for recovering chlorine from gaseous mixtures obtained from the decomposition of volatile metal chlorides with the aid of a combustion of carbonaceous substances in the presence of an excess of oxygenous gases thereby producing a gaseous mixture containing large quantities of carbon dioxide and chlorine and an excess of oxygenous gases comprising contacting said gaseous mixture with an anhydrous sulfur chloride thereby selectively absorbing the chlorine, expelling and recovering the chlorine from said absorbent, enriching the gaseous mixture substantially freed of the chlorine with additional oxygenous gas, and using the enriched gases for the decomposition and oxidation of volatile metal chlorides.

4. A process for recovering chlorine from gaseous mixtures obtained from the decomposition of volatile metal chlorides with the aid of a combustion of carbonaceous substances in the presence of an excess of oxygenous gases thereby producing a gaseous mixture containing large quantities of carbon dioxide and chlorine and an excess of oxygenous gases comprising contacting said gaseous mixture with anhydrous sulfur chloride thereby selectively absorbing the chlorine but leaving traces of chlorine in said gaseous mixture, expelling and recovering purified chlorine from the sulfur chloride substantially free of carbon dioxide, removing the remaining carbon dioxide and traces of chlorine after the absorption of the chlorine, and recovering the residual gases.

5. A process for recovering chlorine from gaseous mixtures obtained from the decomposition of volatile metal chlorides with the aid of a combustion of carbonaceous substances in the presence of an excess of oxygenous gases thereby producing a gaseous mixture containing large quantities of carbon dioxide and chlorine and an excess of oxygenous gases comprising contacting said gaseous mixture with an anhydrous sulfur chloride thereby selectively absorbing the chlorine, expelling and recovering the purified chlorine from said absorbent substantially free of carbon dioxide and recycling it to form volatile metal chlorides from metal-containing raw materials.

WALTER FREY.

References Cited in the file of this patent

UNITED STATES PATENTS

| Number | Name | Date |
| --- | --- | --- |
| 2,228,273 | Klinglehoefer | Jan. 14, 1941 |
| 2,273,723 | Muskat | Feb. 17, 1942 |
| 2,393,229 | Bauchard | Jan. 22, 1946 |

OTHER REFERENCES

"Inorganic and Theoretical Chemistry," by J. W. Mellor, vol. 7, Longmans, Green and Co., N. Y., page 82.

"Modern Inorganic Chemistry," by J. W. Mellor, January 1935, 8th edition, Longmans, Green and Co., N. Y., page 500.